United States Patent [19]

Samar

[11] Patent Number: 4,934,089
[45] Date of Patent: Jun. 19, 1990

[54] CLAMPING DEVICE

[76] Inventor: Robert Samar, 201 NE. 16th Ave., Ft. Lauderdale, Fla. 33301

[21] Appl. No.: 357,952

[22] Filed: May 30, 1989

[51] Int. Cl.5 ............................................... A01K 97/14
[52] U.S. Cl. ................................................. 43/5; 43/6; 294/19.1; 294/19.3; 294/110.1
[58] Field of Search ............... 43/5, 6; 294/19.1, 19.3, 294/110.1, 111, 115

[56] References Cited

U.S. PATENT DOCUMENTS

| 465,069 | 12/1891 | Reid | 294/19.3 |
|---|---|---|---|
| 2,584,881 | 6/1948 | Johnson | 294/19.3 |
| 3,041,102 | 2/1960 | Day | 294/19.1 |
| 3,669,427 | 6/1972 | Curtis | 294/19.3 |
| 3,833,252 | 9/1974 | Redding | 43/5 |
| 3,942,834 | 3/1976 | Kawaguchi | 294/110.1 |
| 3,978,605 | 9/1976 | Maruniak | 43/5 |
| 4,000,576 | 1/1977 | Jones | 43/5 |
| 4,741,283 | 5/1988 | Conner | 114/230 |
| 4,783,926 | 11/1988 | McKinney | 43/5 |

Primary Examiner—Nicholas P. Godici
Assistant Examiner—Michael William Starkweather
Attorney, Agent, or Firm—Foley & Lardner, Schwartz, Jeffery, Schwaab, Mack, Blumenthal & Evans

[57] ABSTRACT

A clamping device suitable for clamping objects such as large fish which includes clamps disposed in scissor-like fashion pivoting about a common point and biasing means such as a rubber band which biases the clamps in a normally closed position. A locking assembly is provided to releasably lock the clamps in an open position and which is released by contacting the clamps against the object to be clamped.

6 Claims, 2 Drawing Sheets

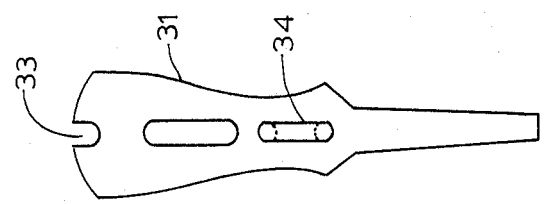
FIG. 6
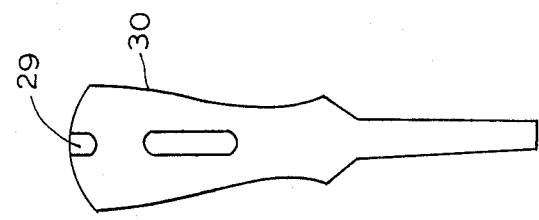
FIG. 5
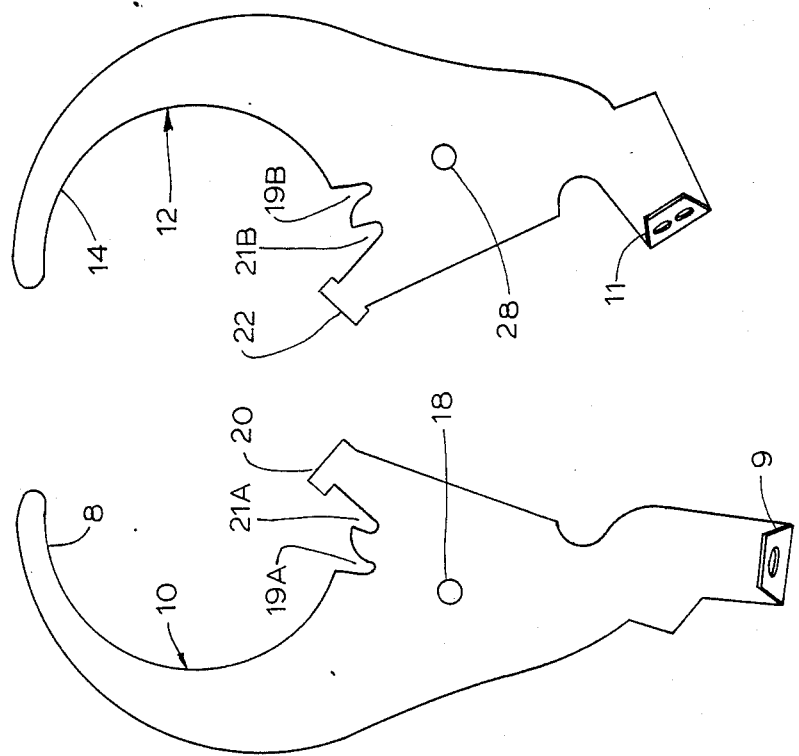
FIG. 4
FIG. 3

CLAMPING DEVICE

BACKGROUND OF THE INVENTION

The present invention relates to a clamping device, more particularly to a clamping device suitable for attaching to large fish such as marlin, tuna, sail fish, etc., after the fish has been caught and brought to the fishing vessel.

In the usual practice of deep sea fishing for large fish, after the fish has been caught and reeled on a fishing line to approach the fishing vessel, a significant effort is necessary to bring the fish on board. Various lines and devices are used to tow the fish and to hoist the fish out of the water.

One approach has been to grasp the fish by securing a device to the gill area and then using the device to pull the fish on board. Unfortunately, in such a practice, the tail section of the fish may remain active sometimes causing injury to people or other damage.

Various clamping devices have been proposed to solve the foregoing problem. In U.S. Pat. No. 4,000,576 there is described a clamping apparatus which utilizes two clamping members pivotally connected at a common point and a leaf spring connected to each member which tends to force them together. The leaf spring may be connected to the end of a rod long enough to distance the holder from the object to be clamped. This particular device, an actuating element operable from the remote end of the rod is connected to the extended ends of the clamping members such that when the clamping members are opened they are held in an open position until a manual operation of the actuating device initiates the closure of the clamping members.

A disadvantage of the above-described clamping apparatus is that it requires remote operation by the holder for both the clamping and holding steps. Furthermore, the operator is required to pull a drawstring to effect the clamping action and tension must be maintained by the operator on the actuating means which typically consists of a pull line. In addition, tension is required to keep the clamping apparatus closed in order to secure the fish or target object.

Another device for clamping large fish is described in U.S. Pat. No. 3,978,605. This patent describes a Cheliform using spring biased jaws held in the open position by a trigger mechanism.

Still another fish retrieving device is disclosed in U.S. Pat. No. 3,833,252 which is directed to an apparatus having a pair of jaws which engage the fish from both sides with tip portions of the jaws designed to pierce the fish. A trigger is included which holds a slide in a cocked position and which may be released in order to permit the jaws to grasp the fish. Still another clamping device utilizing clamping members pivoted about a common point is described in U.S. Pat. No. 4,741,283. This patent is directed to a mooring apparatus for detachably securing a boat to a convenient stationary object.

SUMMARY OF THE INVENTION

The present invention provides an improved clamping device which is activated by contact with a fish or other target object.

In accordance with the present invention, a clamping device is provided comprising a pair of opposing clamping members, each of which has a contact element integrally a part thereof; pivot means connecting said clamping members such as to enable said clamping members to pivot thereon; retaining means for receiving said clamping members and said pivot means, said retaining means having a slot therein and said pivot pin being movable within said slot in response to pressure exerted on said contact elements of said clamping members; elastic biasing means for biasing said clamping members in a normally closed position; and means for releasably locking said clamping members in an open position upon movement of said clamping members into the open position, said locking means being responsive to pressure exerted on said contact elements of said clamping members to release said clamping members from said open position, whereby said biasing means causes said clamping members to seek a closed position.

Means may also be provided for fastening said retaining means to a handle which permits extension of the clamping members from the operator normally positioned on a fishing vessel.

The clamping device is intended to close around the tail section of a large fish upon automatic actuation by contact between the contact elements of the clamping members and the body of the fish and the tail section. Thus, the biasing means by causing the clamping members to seek a closed position, retain the fish within the clamping members.

BRIEF DESCRIPTION OF THE DRAWINGS

The invention may be better understood by reference to the accompanying drawings in which:

FIGS. 3, 4, 5 and 6 are plan views of components of the clamping device.

DETAILED DESCRIPTION OF THE PREFERRED EMBODIMENTS

Figure 2:
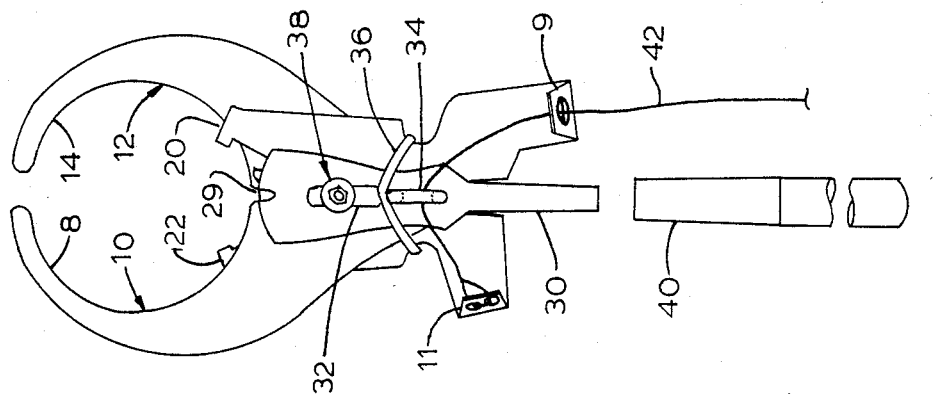
FIG. 2 is an elevational partial isometric view of the clamping device of the invention in a normally closed position.
Figure 1:
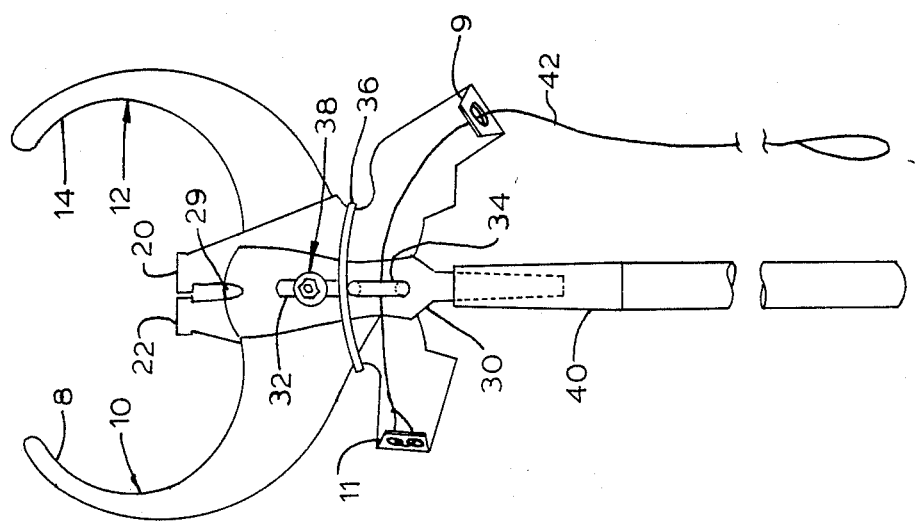
FIG. 1 is an elevational partial isometric view of the clamping device in accordance with the invention in a normally open position.

FIGS. 1 and 2 illustrate the components of the clamping device and the configurations assumed in the normally open and normally closed positions, respectively. The components are also described in FIGS. 3, 4, 5, and 6. In the drawings like numerals refer to like parts.

As can be seen in the views shown in FIGS. 1 and 2, the clamping device comprises a pair of opposing clamping members 10 and 12, each of which has a grasping end 8 and 14 respectively, and which in the preferred embodiment advantageously include flanges 9 and 11 at the opposite ends thereof. The clamping members 10 and 12 are designed to include projecting contact elements 20 and 22, respectively. They are also formed with holes 18 and 28 (best seen in FIGS. 3 and 4).

The clamping device is assembled by overlapping clamping members 10 and 12, in scissorlike fashion, with holes 18 and 28 aligned within slotted retaining means 30 and 31 so that the holes 18 and 28 of the clamping members 10 and 12 may be aligned with the slots 26A and 26B in retaining means 30 and 31, between which the clamping members are sandwiched. In this manner, pivot means 38 can secure clamping members 10 and 12 within restraining means 30 and 31, such as by the nut, bolt, and washer shown in FIGS. 1 and 2 which comprise the pivot means referred to in this embodiment.

Biasing means 36 are provided which tend to keep clamping members 10 and 12 in the normally closed position. The biasing means comprises elastic material such as easily available, sturdy rubberbands. Advantageously, the biasing means is positioned to surround indented portions of the clamping members intermediate the ends thereof, above safety line retaining means 34. The clamping members include flanges 9 and 11 which have apertures for receiving the safety line 42.

A pole 40 is provided which may be secured to retaining means 30 and 31 to enable the clamping device to be actuated a safe distance from the fish to be clamped. In one preferred embodiment, the retaining means 30 and 31 are fastened together via an intermediate member positioned between the end sections of the retaining means opposite that which contains the slot. In this configuration, the retaining means form a U-shaped structure within which the clamping elements 10 and 12 are positioned and the interim member can be used to releasably fasten the pole 40 thereto by, for example, a friction fit.

In operation, the clamping device is used after the fish has been brought to the side of the fishing vessel and is ready for towing or boarding. The device can be attached to the fish directly in front of the tail section in a safe manner by using the clamping device at the end of a lengthy pole.

To "load" the clamping device and lock it in the open position ready for use, clamping members 10 and 12 are manually separated in which case the biasing means pulls down on the sliding lock assembly comprising the retaining elements 30 and 31 within which are secured the clamping elements 10 and 12 by the pivot means assembly 38, as previously described, and member 29 (shown in FIGS. 1 and 2) holds the 30 clamping elements in the opened position within grooves 19A and 19B. When a fish is along side the fishing vessel, the clamping device is aimed at the fish just forward of the tail section and when contact is made between the fish and contact elements 20 and 22, member 29 which has maintained the clamping elements in the open position is disengaged and the clamping elements seek to return to the normally closed position by the force of biasing means 34 such that clasping ends 8 and 14 close around the fish tail automatically by the force of the biasing means and pin 29 seats in grooves 21A and 21B. Advantageously, the pole 40 is easily releasable from the clamping device by a friction fit or quick disconnect coupling which permits convenient removal of the pole, as desired.

A stainless steel cable 42 may be provided as a safety line in which case it can be fastened to flange 11 and threaded through an aperture in flange 9 of the clamping elements via safety line holding or guide means 34. In this way, the safety line cable provides additional protection in case of failure of the biasing means 36. Thus, if the tension on the clamping device is released by, for example, failure of the biasing means or jamming of the clamping device, the safety line which may be attached to the fishing vessel keeps the apparatus clamped over the fish. The fish can also be towed or pulled backward by the fishing vessel when secured in the manner described by the safety line.

It should be noted that in the preferred embodiment, the clamping members are configured such that one end of the clamping members is elevationally displaced relative to the corresponding end of the other clamping member when the clamping device is in the closed position. This feature facilitates greater leverage to keep the clamping members in the closed position about the fish when tension is applied via the safety line, as for example, when the fish is being towed.

It is apparent from the foregoing description that various changes and modifications may be made without departing from the invention. Accordingly, the scope of the invention should be limited only by the appended claims, wherein

What is claimed is:

1. A clamping device comprising:
   a pair of opposing clamping members, each of which having a contact element integrally a part thereof;
   pivot means for connecting said clamping members such as to enable said clamping members to pivot thereon;
   retaining means for receiving said clamping members and said pivot means, said retaining means having a slot therein and said pivot means being movable within said slot in response to pressure exerted on said contact elements of said clamping members;
   elastic biasing means for biasing said clamping members in a normally closed position; and
   means for releasably locking said clamping members in an open position upon movement of said clamping members into the open position, said locking means being responsive to pressure exerted on said contact element of said clamping members to release said clamping members from said open position, whereby said biasing means causes said clamping members to seek a closed position.

2. A clamping device according to claim 1 wherein said clamping members are each provided with at least one groove, further comprising pin means to releasably maintain said clamping members in an open position by coacting with said grooves.

3. A clamping device according to claim 2 wherein said clamping members are each provided with two grooves and said pin means coacts with respective pair of said grooves to releasably maintain said clamping members in the open and closed positions.

4. A clamping device according to claim further comprising safety line guiding means on said retaining means and means to secure said safety line to one end of one of said clamping members, said safety line being threadable through said guiding means and through an aperture in a corresponding end of the other clamping member.

5. A clamping device according to claim 1 further comprising pole means releasably attached to said retaining means to enable extension of said clamping device.

6. A clamping device according to claim 1 wherein said biasing means comprises rubber bands.

* * * * *